Dec. 1, 1959   J. W. SCHWARTZ ET AL   2,915,672
DEFLECTION SYSTEM
Filed Dec. 3, 1956   4 Sheets-Sheet 1
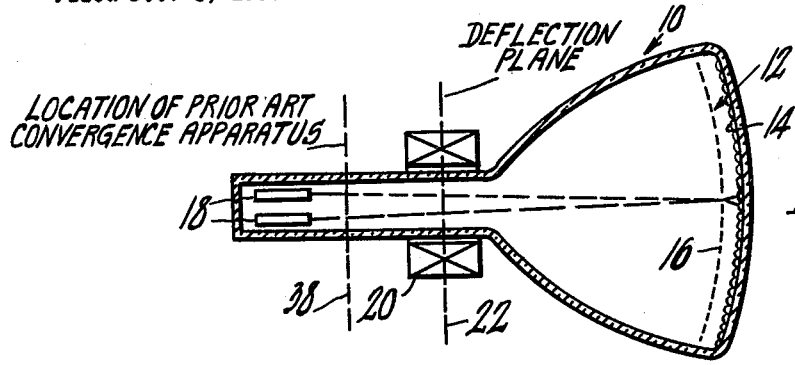
Fig.1.
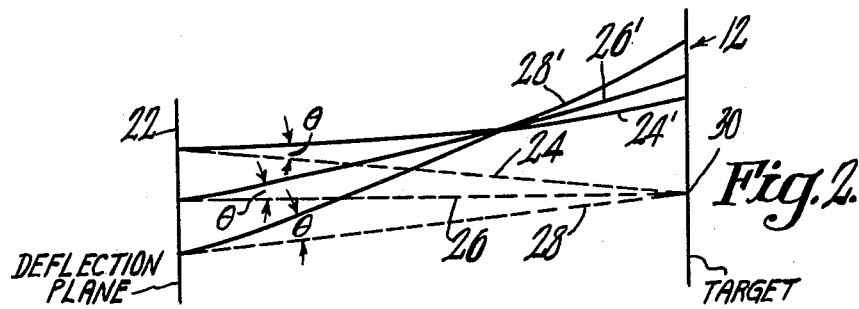
Fig.2.
Fig.3.
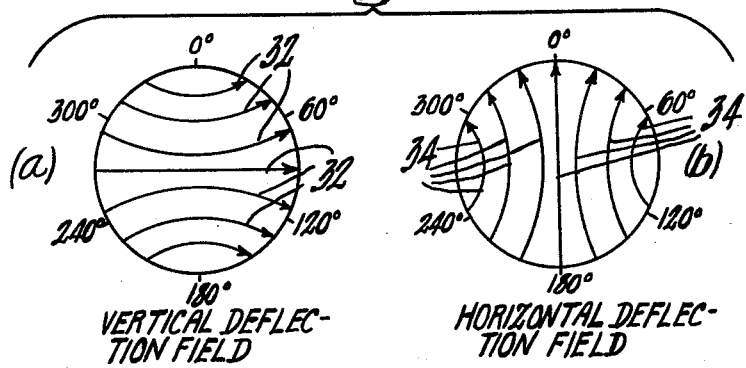
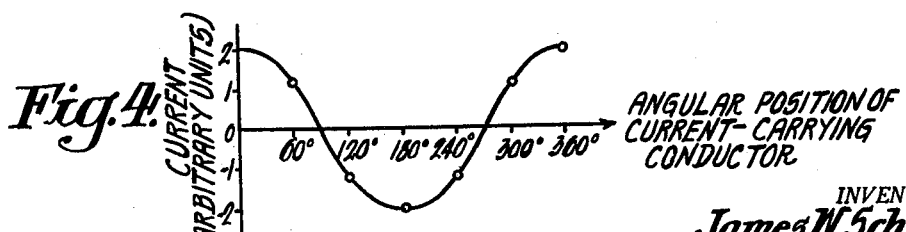
Fig.4.
INVENTORS
James W. Schwartz
& Peter E. Kaus
BY
ATTORNEY Dec. 1, 1959　　　J. W. SCHWARTZ ET AL　　　2,915,672
DEFLECTION SYSTEM
Filed Dec. 3, 1956　　　　　　　　　　　　4 Sheets-Sheet 2
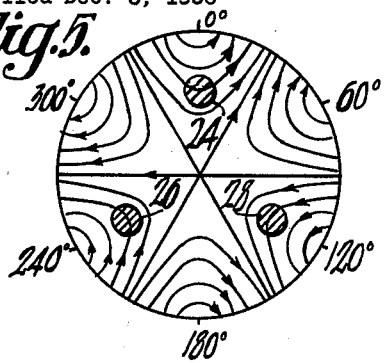
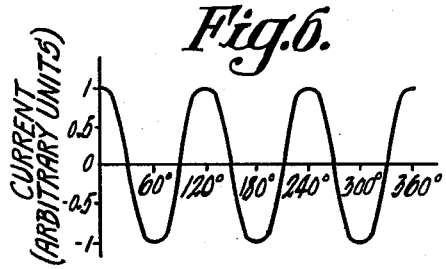
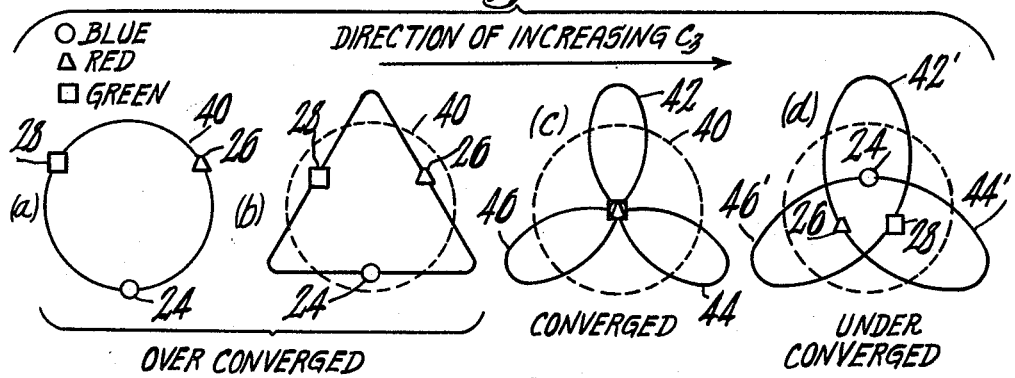
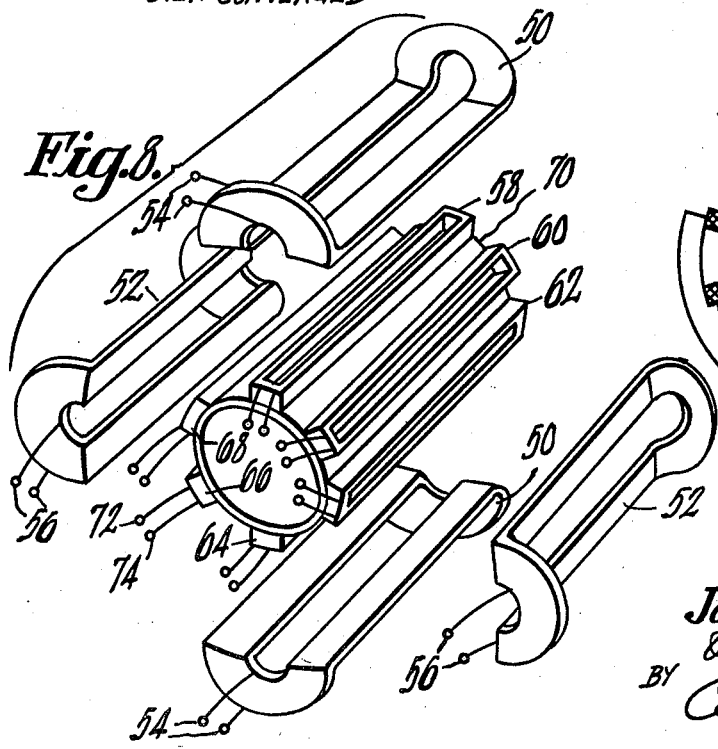
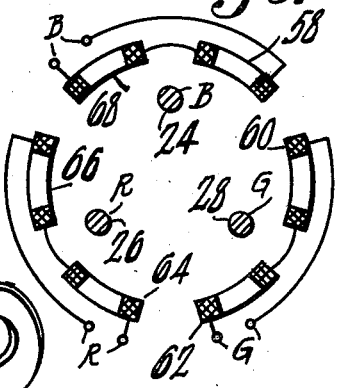
INVENTORS
James W. Schwartz
& Peter E. Kaus
BY
ATTORNEY Dec. 1, 1959   J. W. SCHWARTZ ET AL   2,915,672
DEFLECTION SYSTEM
Filed Dec. 3, 1956   4 Sheets-Sheet 3
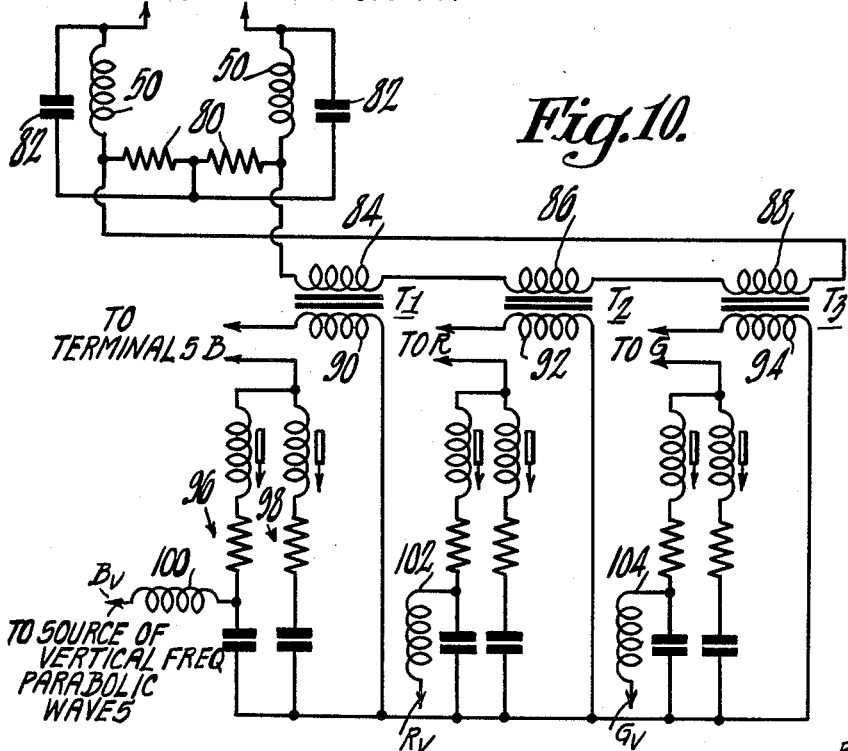
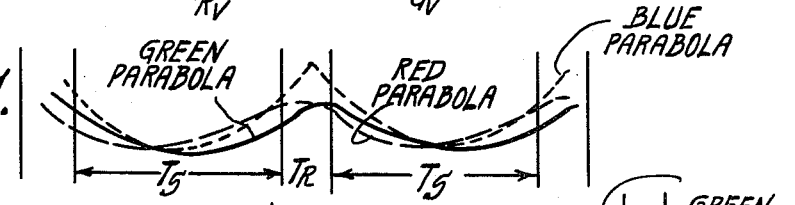
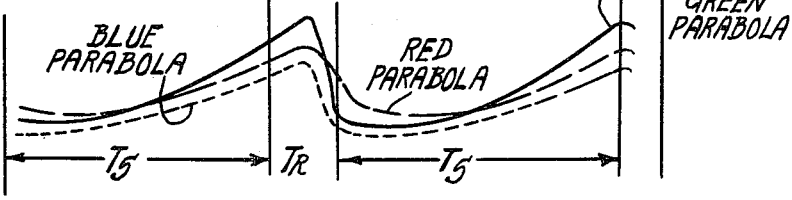
INVENTORS
James W. Schwartz
& Peter E. Kaus
BY
ATTORNEY Dec. 1, 1959 J. W. SCHWARTZ ET AL 2,915,672
DEFLECTION SYSTEM
Filed Dec. 3, 1956 4 Sheets-Sheet 4
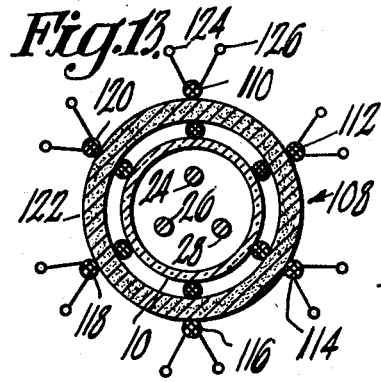
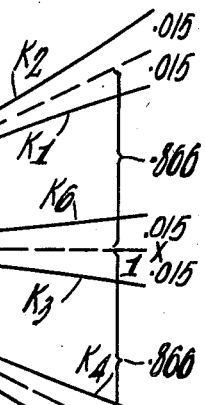
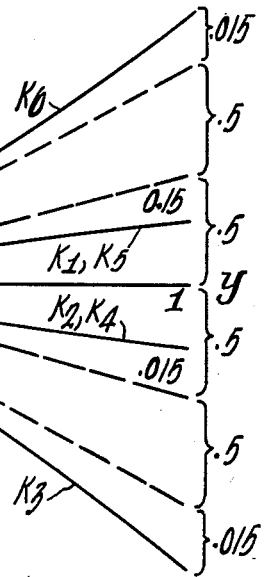
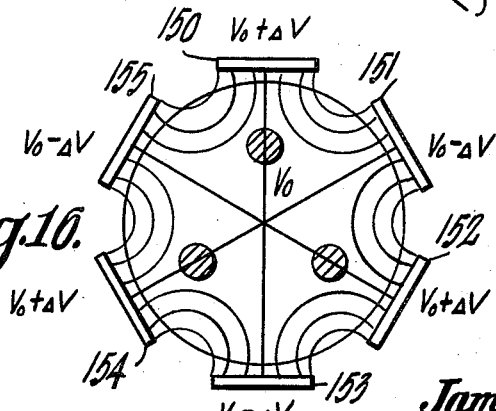
INVENTORS
James W. Schwartz
& Peter E. Kaus
BY
ATTORNEY

2,915,672

DEFLECTION SYSTEM

James W. Schwartz and Peter E. Kaus, Princeton, N.J., assignors to Radio Corporation of America, a corporation of Delaware Application December 3, 1956, Serial No. 625,689

The terminal fifteen years of the term of the patent to be granted has been disclaimed 13 Claims. (Cl. 315—13)

The present invention relates to new and improved cathode ray beam deflection systems and, particularly, to systems capable of effecting deflection and convergence of a plurality of beams in a cathode ray tube.

One type of apparatus with which the present invention may be advantageously employed is a tri-color kinescope of the variety used in conventional color television receivers, such, for example, as the 21AXP22 color kinescope. In that type of kinescope, three electron beam sources, which may be arranged at the apices of an equilateral triangle, for example, direct electron beams toward a target structure including a screen made up of a plurality of trios of phosphor dots, the dots of each trio being adapted to produce light of the different component colors of an image being reproduced. In the kinescope in question, the target structure further includes an apertured masking electrode or shadow mask which is disposed between the electron beam sources and the phosphor dot screen. That is, the shadow mask includes an aperture for and in alignment with each trio of phosphor dots and, depending upon the angle of approach of an electron beam toward the structure, determines which of the phosphor dots will be struck by the electron beam.

The several beams of such a color kinescope are conventionally subjected to raster scanning deflection fields produced, by way of illustration, through the agency of an electromagnetic deflection yoke located on the neck portion of the kinescope between the electron beam sources and the target structure. Since the beams are angularly and spatially related to the longitudinal axis of the tube, different ones of the beams are deflected through different angles and/or distances before reaching the target structure, so that they do not strike the target structure in coincidence. This lack of coincidence of the beams at the target structure is known as misconvergence.

In order to correct for misconvergence, prior art convergence systems exert forces on the beams in such manner as to redirect the beam paths so that the beams leave the deflection plane with directions which are different from what the directions of the beams would have been in the absence of the convergence fields. This redirection of the beams is accomplished at a location which is spaced axially of the tube from the deflection plane and its sense and magnitude are chosen to cause the beams to coincide at the target structure. Because the redirection of the beams in prior art arrangements is effected in a plane other than the deflection plane, the projected beam paths do not intercept the color centers in the deflection plane and color error results. This undesirable effect is termed "degrouping" and will be understood as being directly attributable to the fact that the deflection and convergence functions are performed at different locations measured along the longitudinal axis of the tube.

It is, therefore, an object of the present invention to provide a new and improved deflection system capable of producing deflection of a plurality of beams and in a manner substantially free of misconvergence.

Viewed in another manner, conventional deflection systems such as the usual electromagnetic deflection yoke have only two degrees of freedom, namely, variation in the amplitude of the vertical and horizontal deflection of the center of gravity of the group of beams being deflected. Because, as has been stated, the beams in conventional tubes are angularly and spatially related to the tube axis, the beams are differently affected by the yoke field. Since, as will be understood, merely adding the same angle of deflection to all of the beams does not converge the beams and, since the beams are spaced, they do not all "see" the same field and are, therefore, not all deflected the same amount.

Thus, it is another object of the present invention to provide a deflection system having more than two degrees of freedom.

In general, the present invention provides a deflection system for a cathode ray tube having means for producing a plurality of beams and for directing such beams toward a target, which system has a sufficient number of degrees of freedom to effect scanning deflection of the beams in such manner that the beams substantially converge at all points of the target. That is to say, prior art deflection systems for multi-beam cathode ray tubes have treated of the matter of convergence separately from the matter of deflection, in that such systems conventionally include a scanning deflection yoke having only two degrees of freedom for producing deflection of the beams in two coordinates and a separate convergence system located outside the deflection yoke for reducing the misconvergence of the beams resulting from their scanning deflection.

Thus, the present invention may be viewed, in accordance with one of its aspects, as providing a deflection system having a plurality of deflection field-producing elements whose fields lie in a substantially common plane and means for energizing the elements in such manner as to cause the elements to produce at least three (3) linearly independent, individually controlled deflecting fields, whereby deflection of the beams is accomplished substantially without misconvergence of the beams.

It has been found that, for a cathode ray tube having a plurality, M, of beams, these beams may be deflected respectively to any point on the screen through the agency of a deflection field-generating apparatus having 2M degrees of freedom. By "degrees of freedom" as employed herein is meant the ability to vary one of the two orthogonal coordinates of any given beam without changing any of the coordinates of the other beams or the remaining coordinate of the first-named beam. Further by way of defining terms employed herein, a field-generating apparatus is said to have M degrees of freedom if it comprises means for producing M fields, no one of which can be reproduced by any combination of the remaining M−1 fields.

In accordance with a specific form of the present invention to be described therein by way of illustration of one manner in which the invention may be employed, there is provided a deflection system including an electromagnetic deflection yoke made up of a first pair of coils adapted, when energized, to produce a first transverse deflection field, a second pair of coils arranged about the first pair to produce a second deflection field angularly related to the first field, such that the first and second fields cooperate in producing a resultant deflection field having a common deflection plane. Located within the deflection yoke is field-generating apparatus comprising means for producing at least one additional field, active in the common deflection plane or in a plane closely adjacent thereto, to produce an additional field varying in shape as a function of time in such manner as to effect tilting of the beams respectively in relation to the tube axis to cause the beams to converge at all points on the target structure. It will be recognized, from the foregoing definitions, that the additional field generating apparatus thus affords at least one additional degree of freedom in or near the deflection plane, so that the complete system including the first and second pairs of coils and the additional field generating apparatus associated therewith possesses at least three (3) degrees of freedom. The number of field-generating elements and independent controls therefor comprising the additional field-generating apparatus may be increased, where necessitated by tube structure and yoke characteristics, but the total number of degrees of freedom need, in no event, be greater than 2M, where M is the number of beams being acted upon.

Additional objects and advantages of the present invention will become apparent to those skilled in the art from a study of the following detailed description of the accompanying drawing, in which:

Figure 1 illustrates diagrammatically a color kinescope to be described;

Figure 2 is a diagrammatic showing of certain electron beam paths;

Figures 3(a) and (b) illustrate vertical and horizontal deflection fields;

Figure 4 illustrates a current distribution to be described in connection with Figure 3(a);

Figure 5 is a field pattern in accordance with one form of the present invention;

Figure 6 illustrates a current distribution to be described in connection with Figure 5;

Figure 7 illustrates the effect of the field of Figure 5 on the convergence of a plurality of electron beams;

Figure 8 is an exploded view of a deflection system in accordance with one form of the present invention;

Figure 9 is a simplified sectional view of certain of the coils of Figure 8;

Figure 10 is a schematic diagram of certain suitable circuitry for energizing the coils of Figure 9;

Figures 11 and 12 are waveforms described in connection with the circuitry of Figure 10;

Figure 13 is a vertical sectional view of apparatus in accordance with another form of the invention;

Figures 14 and 15 illustrate horizontal and vertical frequency waveforms to be described in connection with the apparatus of Figure 13; and Figure 16 illustrates one form of the invention wherein the convergence field may be produced by electrostatic plates.

Referring to Figure 1, there is shown by way of example a color television kinescope, such as the 21AXP22 kinescope described in detail in an article entitled "Development of a 21-Inch Metal-Envelope Color Kinescope" by H. R. Seelen et al. in the March 1955, issue of RCA Review. The kinescope 10 is shown only diagrammatically and includes a target structure 12 made up of a phosphor screen 14 and an apertured electrode or shadow mask 16. The shadow mask includes an aperture for and in alignment with each trio of phosphor dots so that it determines which of the phosphor dots of the screen 14 will be struck by the electron beams produced by three electron guns indicated diagrammatically at 18. While the showing of Figure 1 is intended only as diagrammatic, it may be noted that three such electrons guns 18 are included in the tube 10 and, for present purposes, may be considered as being arranged in "delta" fashion at the apices of an equilateral triangle and aimed at a common point on the target structure 12.

Also associated with the kinescope 10 is a conventional deflection yoke 20 which may, for example, be of the type consisting of a first pair of coils forming a horizontal deflection winding, the coils being arranged around the neck of the kinescope 10 in opposing relationship, and a second pair of coils constituting a vertical deflection winding arranged around the first pair of coils at right angles thereto. Such deflection yokes are well known in the art and need not be described further. It should, however, be noted that such a yoke has a deflection plane indicated by the dotted line 22. The deflection plane is a theoretical plane transverse of the longitudinal axis of the tube located intermediate the beam-entrance and -exit ends of the yoke 20.

The causes of misconvergence of a plurality of beams deflected through an angle in a tube such as the kinescope 10 are described in detail in an article entitled "Effect of Magnetic Deflection on Electron Beam Convergence" by P. E. Kaus which appeared in the June 1956 issue of the RCA Review. Figure 2 indicates, in general, the manner in which misconvergence of the plurality of beams occurs. In Figure 2, there are illustrated the reference plane 22 and the target structure 12. The three electron beams 24, 26 and 28 are, in the interest of simplifying the illustration, shown in one plane. Assuming that the beams, in their undeflected positions, are all aimed at a common point 30 on the target structure and assuming further that the three beams are subjected to a uniform deflection field serving to deflect the beams upwardly in the plane of the drawing, it will be seen from Figure 2 that, although all of the beams are deflected by the same angle $\theta$, the deflected beam paths 24' 26' and 28' do not converge at the target 12. The reason for this misconvergence will be understood as stemming from the fact that the beams, in the deflection plane, are angularly related and, therefore, travel through greater distances before reaching the target structure 12.

Before describing conventional apparatus employed for correcting misconvergence, note will be made of the field patterns of Figures 3(a) and 3(b) which illustrate, respectively, conventional vertical and horizontal deflection fields as they appear in the deflection plane 22. Briefly, it may be noted that the vertical deflection field comprises flux lines 32 which are oriented horizontally whereby to effect vertical deflection of a beam or beams entering the field. The horizontal deflection field, on the other hand, comprises vertically oriented flux lines 34, such that a beam or beams entering that field will be deflected in a horizontal direction. Figure 3 also depicts the fact that the flux lines of the vertical and horizontal deflection fields are not perfectly straight lines but are, rather, curved. The curvature of the flux lines will be understood as resulting from the fact that the fields are produced by physical conductors of the yoke 20 which are encircled by the flux making up the fields.

As has been mentioned, a conventional deflection yoke such as the yoke 20 possesses only two degrees of freedom, namely, variation in the amplitude of the vertical deflection field and, secondly variation in the amplitude of the horizontal deflection field. The two fields, being superimposed in the deflection plane, actually produce a net or resultant field which is determined vectorially by the vector addition of the horizontal or X-field and the vertical or Y-field. Thus, as the deflection yoke 20 is energized in a conventional manner by horizontal or line frequency sawtooth waves applied to the horizontal deflection coils and by vertical or field deflection waves applied to the vertical deflection coils, the respective amplitudes of the X and Y fields vary in a sawtooth manner, so that the magnitude and direction of the resultant field is correspondingly varied.

While arrangements by which fields such as those of Figures 3(a) and 3(b) may be produced are known to those skilled in the art, one approach will be explained in connection with Figure 3(a) and Figure 4. That is, assuming that a conductor is located at each of the positions in Figure 3(a) designated 0°, 60°, 120°, 180°, 240°, and 300° and perpendicular to the plane of the drawing, the field of Figure 3(a), which may be termed a uniform field, in that it is symmetrically above and below the horizontal center line, may be produced by passing currents of the values and directions shown in Figure 4 through the six conductors. Assuming, for purposes of convenience, that current flowing through a conductor out of the plane of the drawing is positive and that current flowing through the conductor into the plane of the drawing is negative, the field shape of Figure 3(a) is produced by a current distribution through the 6 conductors of the cosine shape in Figure 4. That is to say, the conductor at the 0° (or 360°) position carries two units of current in the positive direction; the conductor at the 60° position carries one unit of current in the positive direction; the conductor at the 120° position carries one unit of current in the negative direction, etc.

The horizontal deflection field of Figure 3(b), also a uniform field, may be similarly produced by a current distribution through the conductors, which distribution is a sinusoidal distribution, or one 90° displaced in phase from the distribution of Figure 4. The foregoing explanation of a theoretical form of field-generating apparatus will be useful in an understanding of certain modes of operation in accordance with the present invention to be described hereinafter.

Referring again to the matter of misconvergence of the electron beams 24, 26 and 28 at the target structure 12 of the kinescope 10, it has been customary to provide convergence apparatus for effecting the desired beam convergence. One conventional form of convergence apparatus employed in present day color television receivers is described in detail in an article entitled "Deflection and Convergence of the 21-Inch Color Kinescope" by M. J. Obert which appeared in the March 1955, issue of the RCA Review.

Such conventional convergence apparatus, in brief, comprises a plurality of electromagnetic structures mounted around the neck of the kinescope at a location near the electron guns, which location is indicated by the dotted line 38 in Figure 1. Specifically, one such electromagnet is provided for each of the beams and is located in cooperative relationship with a pair of pole pieces of magnetic material located within the tube envelope, such that each beam passes between a pair of internal pole pieces thus energized by the external electromagnet. The pole pieces of such a conventional arrangement are disposed such that fields produced between the pole pieces of each pair are oriented to effect radial movement of the associated beam. In this manner, each of the beams may be "tilted" with respect to the longitudinal axis of the tube such that the beams, after being thus redirected by the convergence fields, converge at all points of the target structure. While such convergence arrangements do, indeed, overcome the natural tendency of the beams to misconverge, the radial tilting of the beams which is employed for convergence-correction itself results in the undesired effect of "degrouping" of the beams. That is, and as has been stated, the redirection of the beams which is accomplished for the purpose of causing them to converge at the target structure of the tube also brings about the condition wherein the beams pass through the deflection plane of the kinescope in such angular and spatial relation thereto that the beams do not approach the shadow mask of the tube at the correct angle.

Since, in the operation of a shadow mask color kinescope, the angle of approach of a beam toward the shadow mask determines the color phosphor dot which the beam will strike, such changes in the angular approaches of the beams as are brought about by conventional convergence apparatus result in the beams' striking the wrong phosphor dots, thereby resulting in color error. By way of recapitulation, it is to be borne in mind that the basic reason for the undesirable effects of beam misconvergence, on the one hand, and degrouping resulting from the use of conventional convergence apparatus, on the other hand, is that conventional convergence yokes have only two degrees of freedom, insofar as the fields produced thereby in the deflection plane are concerned. Thus, the present invention provides, as has been stated, a novel deflection system having a requisite number of degrees of freedom in the region of the deflection plane for producing deflection of a plurality of electron beams, which deflection is substantially free of misconvergence, while not introducing such undesirable effects as degrouping.

It has been found by mathematical analysis that a conventional deflection yoke such as that described operated in the usual manner (i.e., with line- and field-frequency-sawtooth energization) is incapable of producing misconvergence-free deflection of a plurality of beams. The best which can be accomplished with such a yoke is anastigmatic deflection. As applied to a yoke employed in deflecting a single electron beam, the term "anastigmatic" refers to the situation in which a beam focused to a point at the center of the target, for example, in its undeflected position, is uniformly or symmetrically defocused to a circular spot after deflection. Thus, as applied to the deflection of a plurality of beams, the term "anastigmatic" as employed herein is descriptive of the situation in which several beams emanating from points on a circle and which are converged at the center of the screen in the undeflected condition, are, though misconverged, located at points on a circle after deflection.

In accordance with the present invention, therefore, means are provided for producing, in substantially a common plane, a field which varies not only in direction and intensity as a function of time to produce scanning deflection of the beams, but also in shape as a function in time, whereby to effect radial tilting of the beams of such direction and magnitude, respectively, as to cause the beams to converge at all points on the target. Viewed, for the present, in its simplest aspect, the apparatus required for accomplishing the foregoing may comprise a conventional deflection yoke such as that described for producing a field which varies in direction and amplitude as a function of time to produce scanning deflection of the beams and additional means for producing the second-named variation, namely, the variation in field shape as a function of time.

Figure 5 illustrates a field shape which may be produced in the deflection plane, in accordance with one form of the present invention, for superposition upon the usual deflection fields such as those shown in Figures 3(a) and 3(b). The field pattern of Figure 5 may be understood, therefore, as being located in the plane 22 of Figure 1. The electron beams 24, 26 and 28 are represented in cross-sectional form by the circles bearing those reference numerals and, for purposes of illustating a particular form of the invention, are shown as located generally at the apices of an equilateral triangle. Also for purposes of explanation, it may be considered that a conductor is located at each of the 60° intervals noted around the periphery of the field pattern, just as was described in connection with the description of Figure 3. By energizing the six conductors in accordance with the current distribution represented by the cosinusoidal curve of Figure 6, the field pattern of Figure 5 may be produced. That is, alternate ones of the conductors (0°, 120°, and 240°) may be energized with current flowing in a first direction (out of the plane of the drawing), while the intervening conductors are energized with current flowing in the opposite direction (into the plane of the drawing).

From the showing of Figure 5, it will be recognized that the field in the region of each of the beams is generally a tangential field such as to produce radial deflection of its associated beam. By controlling the strength and direction of each of the currents flowing through the conductors and, therefore, of the fields produced thereby, the beams may be moved along radii of the tube independently of each other. Where the scanning deflection yoke involved is an anastigmatic yoke as described above, and the beams are located at the apices of an equilateral triangle, the several fields produced by the conductors may be equal in magnitude, although of opposite sign as represented in Figure 5. As will be described in detail hereinafter, the direction and magnitude of the fields may be varied as a function of time (in synchronism with deflection of the beams by the scanning deflection yoke) to cause the beams to converge at all points on the target structure.

The manner in which the field of Figure 5 is effective to produce convergence of a plurality of beams is represented diagrammatically in Figure 7 which depicts, in four views, the effects of variation of the magnitudes of the fields shown in Figure 5. Figure 7(a) illustrates the beam spots on the target structure as located on the periphery of a circle 40. The beam spots, for purposes of identification, are indicated by the same reference numerals as those indicating the beams themselves in Figure 2. This position of the beam spots may, for reference purposes, be considered as being that which occurs when the beams "cross-over" too soon before reaching the target. That is, the beams may be said to be "over-converged." Figure 7(b) also indicates the disposition of the beam spots 24, 26 and 28 in a condition of over-convergence, but of somewhat smaller degree. It will be recognized from Figures 7(a) and 7(b) that, in the latter figure, the beam spots have moved radially inwardly toward the center of the circle 40.

Figure 7(c) illustrates the disposition of the beam spots in the condition of convergence. That is, the spots are coincident and are located at the center of the circle 40. The several lobes 42, 44 and 46 are representative of regions in which the forces of the field pattern of Figure 5 tend to move electrons outwardly, while the areas between the lobes are those in which the fields tend to move electrons inwardly. Since the beams 24, 26 and 28 in question here are located (as may be seen from Figures 7(a) and 7(b) in regions outside of the lobes 42, 44 and 46, the beams are converged by the field pattern of Figure 5. Since no electron beams are located within the lobes, the fact that the field forces active in those regions are such as to move electrons outwardly is of no moment. Figure 7(c) thus serves to illustrate the fact that a plurality of electrons located at different positions may be converged, in accordance with the present invention, by providing a sufficient number of field-producing means for producing fields required for independent movement of the beams.

Figure 7(d) is similar to the other showings of Figure 7 but is illustrative of the situation of "under-convergence" such as would result from too little energization of the conductors described in connection with Figure 5. Again, as in the case of Figure 7(c), the lobes 42', 44' and 46' represent regions in which the field pattern of Figure 5 is active to effect radial inward movement of the beams.

Figure 8 illustrates a specific structural embodiment of the present invention according to that aspect thereof in which means are provided, as described in connection with Figure 5, for superimposing on the regular scanning deflection field (e.g., Figures 3(a) and 3(b)) an additional field (e.g., Figure 5) which varies in shape as a function of time and in such manner as to cause the deflected beams to converge at all points on the target structure. In the exploded view of Figure 8, there are shown the horizontal and vertical deflection coils 50 and 52, respectively, of a conventional scanning deflection yoke. In accordance with conventional practice, the horizontal deflection coils 50, when placed together on opposite sides of the kinescope neck, form a generally cylindrical structure. The vertical deflection coils 52 are assembled around the horizontal deflection coils 50 and at right angles thereto to form the scanning deflection yoke per se. A cylindrical core (not shown) of suitable magnetic material may be disposed around the assembled pairs of coils to afford a low reluctance return path for the deflection flux produced by the coils.

It will further be noted from Figure 8 that each of the coils 50 and 52 is provided with a pair of input leads. Thus, for example, each of the coils 50 is provided with a pair of input leads 54, while each of the vertical deflection coils 52 is provided with a pair of leads 56. In accordance with conventional practice, the coils 50 may be connected in series, leaving one pair of leads for connection to the source of sawtooth energy of line deflection frequency. Similarly, the vertical deflection coils 52 may be connected electrically in series, leaving two input terminals for connection to the source of field deflection sawtooth energy. In the event of such conventional interconnection, the horizontal deflection coils 50 may be considered as constituting a single winding having a pair of input terminals and the vertical deflection coils 52 may be considered as constituting a second winding having its pair of input terminals. By virtue of such interconnection and energization, it will be understood that the deflection yoke, as set forth supra, possesses two degrees of freedom.

In accordance with the present invention, the additional structure illustrated in Figure 8 is provided for affording the additional degrees of freedom required for effecting dynamic convergence of the several electron beams as described in connection with Figures 5–7. In the specific form shown, the convergence apparatus may be viewed as a field generating apparatus made up of a plurality of field generating elements. The field generating elements comprise electromagnetic coils 58, 60, 62, 64, 66 and 68 arranged at 60° intervals about the periphery of a cylindrical coil form 70 of plastic or other insulating, non-magnetic material. The disposition of the auxiliary coils 58, 60, etc. in relation to the electron beams in the kinescope 10 in accordance with one operative form of the invention is illustrated by the vertical sectional view of Figure 9, wherein, for purposes of simplicity, only the auxiliary coils are shown. The coils in Figure 9 are viewed from the target end of the kinescope with which they are associated.

The coils 58 and 68 may be considered as being primarily associated with and operative to produce a field effective upon the beam 24, while the coils 60 and 62 may be understood as being similarly related to the beam 28. In the same manner, the coils 64 and 66 may be thought of as associated with the beam 26. More specifically, the coils 58 and 68 are connected in series with each other and are so wound that the inner side conductors of the coil 68 produce flux of the same direction as that produced by the inner side conductors of the coil 58. Similarly, the coils 60 and 62 are so connected and arranged that the inner side conductors of the coils 60 and 62 produce flux in an aiding relationship, the same being true of the coils 64 and 66. In this manner, the adjacent outer side conductors of the adjacent pairs of coils produce flux in a mutually aiding sense.

For purposes of correlation with Figure 5, it will be understood that the inner side conductors of the coils 58 and 68 may be understood as corresponding to the single theoretical conductor described as being located at the 0° position in Figure 5. Similarly, the outer side conductors of the coils 58 and 60 may be considered as constituting the single theoretical conductor described as being located at the 60° position in Figure 5. By thus energizing the coils shown in Figure 9, the field pattern of Figure 5 may be readily produced. It is further to be noted that, by virtue of the described interconnection of the convergence coils, there result three pairs of coils, namely, the coil pair 58, 68, the pair 60, 62 and the pair 64, 66, each pair having its own pair of input terminals. Since, in the showing of Figure 9, the beams 24, 26 and 28 are also indicated, in the interest of affording a specific example, as the blue, red and green-designated beams (B, R and G, respectively), the input terminals to the three coil pairs are designated by corresponding reference characters B, R and G.

Assuming that the deflection yoke associated with the three coil pairs of Figure 9 is an anastigmatic yoke and, further, that the electron beams are located at the apices of an equilateral triangle, the dynamic convergence of the beams may be achieved, at least to a first order approximation, by energizing the coil pairs respectively with generally parabolic current waves of suitable amplitude and frequency. That is, each of the coil pairs may be energized with both a first parabolic current wave of line deflection frequency and a second parabolic current wave of field deflection frequency. Since apparatus for producing such current waves is well known in the art for use with prior art convergence systems, such apparatus need not be described in detail here. Rather, it is sufficient to note that circuitry capable of producing the desired waves is disclosed in the above-cited article by M. J. Obert.

In the interest of completeness of discription, Figure 10 illustrates circuitry employed in one specific embodiment of the present invention in which six coils, arranged in pairs as in Figure 9, are located within a conventional deflection yoke, as in Figure 8. Figure 10 illustrates the horizontal deflection coils 50 connected through a pair of small resistors 80 and shunted by balancing capacitors 82. Three serially connected transformer primary windings 84, 86 and 88 are connected across the resistors 80, so that current corresponding to the deflection current is caused to flow through the windings 84, 86 and 88. The transformers $T_1$, $T_2$ and $T_3$ with which the primary windings are associated further include secondary windings 90, 92 and 94, respectively. Each of the secondary windings has associated therewith a plurality of series-resonant circuits, such as the circuits 96 and 98 associated with the secondary winding 90, which circuits are resonant at the first and second harmonics of horizontal deflection frequency. Thus, by virtue of the action of the transformers $T_1$, $T_2$ and $T_3$, currents corresponding to the horizontal deflection current are caused to flow in the several transformer secondary winding circuits and are integrated thereby and by the inductance of the auxiliary coils shown in Figure 9 to form generally parabolic current waves in the coils. It will be noted that the circuit associated with the secondary winding 90 is designated for connection to the terminals B connected to the coils 58 and 68. Similarly, the circuit of the winding 92 is designated for connection to the input terminals R of the coils 64, 66, while the circuit of the transformer winding 94 is adapted for connection to the terminals G of the coils 60 and 62.

Energization of the three pairs of auxiliary coils with vertical deflection frequency parabolic waves is accomplished via isolating inductors 100, 102 and 104 which are adapted for connection to respective sources of vertical frequency parabolic waves.

In the operation of the specific embodiment described in connection with Figures 8–10, it was found that suitable convergence of the three beams of a 21AXP22 kinescope provided with a standard color kinescope deflection yoke was afforded by energizing the auxiliary coils with horizontal deflection frequency parabolic current waves such as those shown in Figure 11 and with vertical frequency parabolic current waves such as those shown in Figure 12. More specifically, Figure 11 illustrates three curves designated "blue parabola," "red parabola" and "green parabola." These curves are illustrated with respect to a time scale showing the horizontal scanning time $T_s$ and the horizontal retrace time $T_r$. From Figure 11, it may be seen that the wave applied to coils 58, 68 is a generally symmetrical wave, while the waves applied to the coil pairs 60, 62 and 64, 66 are "tilted" in opposite senses. By "tilt" is meant the fact that the wave is asymmetrical in that its focal point is to one side of the midpoint of the scanning period. Such tilting may be conventionally accomplished, as in the case of commercial convergence circuits, through the addition of a prescribed amount of sawtooth wave energy to the parabolic wave energy. The waves of Figure 12 represent the vertical frequency current waves applied to the three pairs of coils and are tilted as indicated.

The series resonant circuits such as the circuits 96 and 98 associated with the coil pair 58, 68 are, as has been mentioned, tuned, respectively, to the horizontal deflection frequency and its second harmonic. The purpose of these circuits is that of overcoming the undesirable effect of inductive feedthrough into the coils 58, 68 of the flyback pulses appearing across the horizontal deflection coils 50. That is, flyback pulses thus induced into the coils 58 and 68 and their second harmonic "see" a relatively low impedance in the resonant circuits 96 and 98, but all higher harmonics "see" a much greater impedance and are, therefore, greatly attenuated. Since the higher harmonics of horizontal deflection frequency are those which produce undesirable effects, the provision of the resonant circuits substantially minimizes such effects. If desired, one or more additional series-resonant circuits tuned to higher harmonics of deflection frequency may be connected in parallel with the ones described. It may be noted that the problem of induced energy in the auxiliary coils is less in the case of the coils 58, 68 than in the case of the other two pairs of coils because voltages inducted in the coils 58, 68 tend to cancel, since the horizontal deflection flux producing such voltage intersects the coils 58 and 68 symmetrically.

As set forth, the specific embodiment described thus far is one in which a conventional deflection yoke having two degrees of freedom is provided with additional degrees of freedom through auxiliary coils disposed within the yoke, which auxiliary coils serve to superimpose on the main deflection yoke field an additional field which varies in shape as a function of time. It will further be recognized from the description of Figures 8–12 that the three pairs of auxiliary coils, being independently controlled to produce linearly independent fields afford three degrees of freedom in addition to the degrees possessed by the deflection yoke itself.

Figure 13, however, illustrates a form of the invention according to which the deflection and convergence functions are shared by a single group of coils. The form of deflection yoke illustrated in Figure 13 is that of a toroidal yoke which is indicated in its entirety by reference numeral 108. The yoke 108 is shown in section in relation to the neck portion of the kinescope 10 and comprises six coils 110, 112, 114, 116, 118 and 120 arranged equiangularly about the periphery of the kinescope neck. Each coil is wound about a magnetic core 122 of ferrite or other low reluctance magnetic material, such that, when the coils are energized with current, the flux lines produced by the turns of the coils located outside of the core 122 may be disregarded, insofar as their effect upon the beams within the tube are concerned. Since each coil includes a pair of input terminals, such as the terminals 124 and 126 of the coil 110, it will be recognized in accordance with the foregoing definitions that each coil possesses a degree of freedom. Thus, with six (6) coils provided for three (3) beams, it is seen that there are provided 2M degrees of freedom.

In order that the current waves required for energizing the several coils to effect scanning deflection substantially free of misconvergence may be determined, there follows a mathematical analysis of the fields produced by the coils. In general, the coil arrangement described in connection with Figure 13 consists of N coils, all situated on a cylinder of unit radius and extending in position on the longitudinal or Z axis of the tube from a point $Z=0$ to $Z=l$. The axis of the cylinder is characterized by $r=0$. Further parameters to be described are the following:

$L$=distance from yoke field to target
$\alpha$=convergence angle=$r_0/L=S/p$
$\theta$=one half-deflection angle It may further be considered that each coil consists primarily of two very close parallel wires joined together to the point $z=0$ and $z=l$. Both are intersected perpendicularly by the same radius vector and, therefore, belong to the same azimuthal angle $\phi$. The Nth coil is at an angle $\phi_n$ and carries an instantaneous current proportional to $k_n$ in the subsequent calculations, the end effects of the field will, in the interest of simplicity, be neglected, so that the vector potential may be considered as being entirely in the $z$-direction.

(1) $$A\frac{n}{z}=K_n\sum_{p=1}^{\infty}r^p[\cos p(\varphi-\varphi_n)] \quad 0\leq z\leq l$$
$$=K_n\sum_{p=1}^{\infty}r_p[\cos p\varphi \cos p\varphi_n+\sin p\varphi \sin p\varphi_n]$$

The total vector potential is then given by:

(2) $$A_z=\sum_{n=1}^{N}K_n\sum_{p=1}^{\infty}r_p[\cos p\varphi \cos p\varphi_n+\sin p\varphi \sin p\varphi_n]$$

Defining two new quantities:

(3) $$NC_p=\sum_{n=1}^{N}K_n \cos p\varphi_n$$
$$NS_p=\sum_{n=1}^{N}K_n \sin p\varphi_n$$

There is obtained
$$A_z=N\sum_{p=1}^{\infty}r_p[C_p \cos p\varphi + S_p \sin p\varphi]$$

Which corresponds to a field:

(4) $$H_r=N\sum_p r^{p-1}p[-C_p \sin p\varphi + S_p \cos p\varphi]$$
$$H=N\sum_p r^{p-1}p[-C_p \cos p\varphi - S_p \sin p\varphi]$$
$$H_z=0$$

One example of such a field is given in Figure 3($a$), wherein the field shown is one corresponding to $C_1=1$, all other $C_p$ and $S_p$ being zero. Figure 3($b$) illustrates a field corresponding to $S_1=1$, all other fields $C_p$ and $S_p$ being zero. These fields in $C_p$ and $S_p$ are, as stated, uniform fields in the horizontal and vertical directions, respectively. The field pattern of Figure 5, on the other hand, is one corresponding to $C_3=1$, all other $C_p$ and $S_p$ being zero.

The $C_p$ and $S_p$ fields are correlated with currents in the coils by assuming that the coils are equally spaced from each other, such that
$$\varphi_n=(2\pi)\left(\frac{n}{N}\right)$$
furthermore,
$$C_{N+p}=C_p$$

which means that actually there are only N independent $C_p$. The field H depends on $(pr^{p-1})$ from Equation 4 and, since $r\ll 1$, the lower order $C_p$ fields are those which are of the greatest importance.

In the illustrated example of Figure 13, wherein $N=6$, which corresponds to coils every 60°, solving for $K_n$ from Equation 3, $$K_1=C1-C2-C3+C6$$
$$K_2=-C1-C2+C3+C6$$
$$K_3=-2C1+2C2-C3+C6$$
$$K_4=-C1-C2+C3+C6$$
$$K_5=C1-C2-C3+C6$$
$$K_6=2C1+2C2+C3+C6$$

and $$C2=C4, \quad C1=C5$$

To obtain the uniform field of Figure 3($a$), for example, the assignment of $K_n$ is:

$$K_1=1, K_2=-1, K_3=-2, K_4=-1, K_5=1, K_6=2$$

Since $\phi_n=(2\pi)(n/6)$, it is seen that in this case $K_n$ is proportional to $\cos(\phi_n)$, which is the well known cosine distribution described above in connection with Figure 4 for obtaining the uniform field described as $C_1=1$.

To obtain the field of Figure 5, it is necessary to substitute $C_3=1$, all other $C_p$ being equal to zero, from which are obtained the following:

$$K_1=-1, K_2=1, K_3=-1, K_4=1, K_5=1, K_6=1$$

In this case,
$$K_n=\cos(3\phi_n)$$

From the foregoing, it is seen that the relationship between currents through coils and magnetic fields is readily established, a fact which is of importance in translating desired field shapes into wave shapes.

While the deflection field is defined in terms of $C_1+S_1$, the convergence field is given by the vector potential:

(6) $$A_z^c=N\sum_{p=2}^{\infty}r_p[C_p \cos p\varphi + S_p \sin p\varphi]$$

For purposes of simplifying the mathematical analysis, the three beams may be considered as lying on the periphery of a thick beam. Thus, the motion of the last-defined field (i.e., the convergence field) on the peripheral rays of a thick beam of a radius $r_0$ will be determined. The motion of a central ray due to the convergence field is zero. The motion due to $A_z^c$ in the radial direction will be termed $\Delta_r$ and that in the tangential direction $r_0\Delta\varphi$ there is obtained:

(7) $$\Delta R=\mu l\left[L-\frac{1}{2}l\right]\sum_{p=2}^{\infty}pr_0^{p-1}[C_p \cos p\varphi_0 + S_p \sin p\varphi_0]$$
$$r_0\Delta\varphi=\mu l\left[L-\frac{1}{2}\right]\sum_{p=2}^{\infty}pr_0^{p-1}[C_p \sin p\varphi_0 - S_p \cos p\varphi_0]$$

Retaining only terms of the order $r_0^2$ or lower, there is obtained:

$$\Delta R=-\mu[l(L-l/2)]\{2L\alpha[C_2 \cos 2\varphi_0 + S_2 \sin 2\varphi_0] + 3L^2\alpha^2[C_3 \cos 3\varphi_0 + S_3 \sin 3\varphi_0]\}$$

(8) $$r_0\Delta\varphi=\mu[l(L-l/2)]\{2L\alpha[C_2 \sin 2\varphi_0 - S_2 \cos 2\varphi_0] + 3L^2\alpha^2[C_3 \sin 3\varphi_0 - S_3 \cos 3\varphi_0]\}$$

where $\alpha=(r_0/L)$

The deflection field $C_1, S_1$ alone will have the usual aberrations, primarily astigmatism. Assuming that anastigmatic deflection is achieved, the misconvergence on a radius R on the target will be:

$$\delta R=(\frac{1}{2})[L(1+L/l)/(L-l/2)^2]\alpha R^2$$
(9)
$$\delta\varphi=0$$

If the convergence field is superimposed on this, there may be obtained from Equation 9

$$\delta R=(\frac{1}{2})[L(1+L/l)/(L-l/2)^2]\alpha R^2+\Delta R$$
(10)
$$r_0\delta\varphi=r_0\Delta\varphi$$

In order to reduce misconvergence to zero, the following equations must be solved:

$$\Delta R=-(\frac{1}{2})[L(1+L/l)/(L-l/2^2]\alpha R^2$$
(11)
$$r_0\Delta\varphi+0$$

An inspection of Equation 9 shows, however, that $\Delta R$ and $\Delta\varphi$ depend upon the original azimuth $\varphi_0$. It is, therefore, not generally possible to make misconvergence vanish entirely, as explained in connection with Figure 7. The three guns of the tricolor kinescope described are, however, situated on the outer edge of the hypothetical conical beam, so that only three positions of $\varphi_0$ are occupied. For a "delta" gun, these are:

(12) $\quad\quad\quad \varphi_0 = 0, 2\pi/3, 4\pi/3$

From Equation 9, it is seen that $\cos 3\varphi_0 = 1$ at these 3 positions and $\sin 3\varphi_0 = 0$. Thus, if it is postulated that all fields $C_p$, except $C_1$ and $C_3$, and $S_p$, except $S_1$, vanish, there is obtained the three values of $\varphi_0$ in Equation 12, by using Equation 10;

(13) $\quad\quad \delta R = (\frac{1}{2})[L(1+L/l)/(L-l/2)^2] \alpha R^2 - 3\mu L^2 l(L-l/2)\alpha^2 C_3$ $\quad\quad r_0 \delta\varphi = 0$ The condition on field $C_3$ is, therefore,

(14) $\quad C_3 = [(1+L/l)/6\mu L l(L-l/2)^3 \alpha] R^2$

The several showings of Figure 7 illustrate the effect of adding various amounts of the convergence field $C_3$ to the uniform $C_1$. It is apparent from this figure that the field $C_3$ is a pure coma field. In fact, it may be seen from Equation 9 that the field $C_2$ is an astigmatism field, proportional to $\alpha$ and that $C_3$ is a coma field proportional to $\alpha^2$. Thus, the convergence can be thought of as adjusting the coma so that it just overcomes the astigmatism. It is further to be noted that, while astigmatism increases as the second power of the deflection angle, coma increases as a first power. It is, therefore, necessary to adjust the coma in a non-linear fashion at each deflection angle.

The following definitions of the $C_1$ and $S_1$ fields may also be obtained:

(15) $\quad\quad C_1 = [Y/\mu l(L-l/2)]$ $\quad\quad S_1 = [X/\mu l(L-l/2)]$ where X and Y are the $x$ and $y$ coordinates on the target.

As a specific example, numerical values may be assumed for a typical kinescope and yoke arrangement, namely, $L=12$, $l=4$ and $\alpha=0.02$. By substituting in Equation 5, the currents in the six-coil yoke of Figure 13 may be determined as follows:

(16) $\quad AK_1 = .5Y + .866X - .015 (X^2+Y^2)$
$\quad\quad AK_2 = -.5Y + .866X + .015 (X^2+Y^2)$
$\quad\quad AK_3 = -Y - .015 (X^2+Y^2)$
$\quad\quad AK_4 = -.5Y - .866X + .015 (X^2+Y^2)$
$\quad\quad AK_5 = +.5Y - .866X - .015 (X^2+Y^2)$
$\quad\quad AK_0 = Y + .015 (X^2+Y^2)$ The factor A in the foregoing equations contains all common constants and depends primarily on the velocity of the electrons. The six values of $K_n$ of these equations thus represent the currents necessary in the six coils of the toroidal yoke of Figure 13, wherein the coils are spaced apart by 60°. This formula can be extended to any number of coils by using:

(17) $AK_n = Y \cos \varphi_n + X \sin \varphi_n + (.015)(X^2+Y^2) \cos 3\varphi_n$ Figure 14 represents a plot of the Equations (16) for the horizontal deflection frequency waveforms to be applied to the six coils of Figure 13. It will be noted that, in Figure 14, the current waves are generally parabolic in wave shape. The wave indicated by reference character $K_1$ is that which must flow through the coil 112 of Figure 13; the current $K_2$ is that which must flow through the coil 114 in Figure 13 and so forth, the current $K_6$ being that which must flow through the coil 116. Similarly, Figure 15 illustrates the current waves which must flow through the coils of Figure 13, which waves are of vertical deflection frequency. These waves are also of generally parabolic shape. Since the current waves of Figures 14 and 15 are, in both cases, generally parabolic, it will be recognized that any suitable apparatus for producing such current waves may be employed in connection with the yoke of Figure 13. It should further be noted that the curves in Figures 14 and 15 constitute only half the scan time. That is, the curves are all symmetrical with respect to the abscissae.

While the yoke illustrated in Figure 13 includes six small coils spaced apart by 60° about the periphery of the kinescope neck, the coils may, in practice, be distributed, rather than "grouped," in order that the fields produced thereby may be more properly shaped.

Those skilled in the art will recognize from the foregoing that both the systems of Figures 8 and 13 are capable of providing substantially misconvergence-free scanning deflection of a plurality of beams in a cathode ray tube. In both cases, moreover, the deflection and convergence functions are accomplished in substantially the same plane transverse of the beam paths, so that no degrouping of the beams occurs as in the case of prior art convergence systems located at a point spaced axially of the tube from the deflection plane. That is, in the system of Figure 8, the convergence field produced by the three auxiliary pairs is active in or adjacent to the deflection plane of the yoke, while in the system of Figure 13, the same six coils effect both deflection and convergence.

While the illustrative embodiments described thus far involve electromagnetic field generating means, it should be borne in mind that electrostatic field-producing elements may also be employed. For example, Figure 16 illustrates one form of the invention wherein the $C_3$ or convergence field, by way of example, is produced by electrostatic plates. Figure 16 illustrates the electrostatic field generated by six such plates, 150–155. Taking the potential at the center of the system as $V_0$, the potential of the plates may be varied to produce linearly independent deflection or convergence field components. The particular field illustrated will produce uniform convergence of the three beams indicated. It will be noted that the electrostatic field lines in Figure 16 are substantially perpendicular to the magnetic field lines of Figure 5.

Having thus described our invention, what we claim as new and desire to secure by Letters Patent is:

1. Apparatus for deflecting electrons in a cathode ray tube, said apparatus comprising means for producing an electromagnetic field whose shape in a given plane is generally uniform and whose direction varies to produce scanning deflection of such electrons; and means for producing and superimposing on said first field a second field in substantially said given plane, the configuration of said second field being such that such composite field varies in shape as a function of time.

2. A deflection system which comprises a cathode ray tube having a target and means for producing and directing a plurality of electron beams toward said target; deflection apparatus located adjacent the paths of such beams, said apparatus comprising means for producing in substantially a single plane transverse of said paths at least three linearly independent deflection fields; and means for energizing said apparatus with waves of deflection energy to cause said field producing means to produce at least three such linearly independent fields, the resultant of said independent fields being a field which deflects said beams, as a group, across said target.

3. A deflection system which comprises a cathode ray tube having a target and means for producing and directing a plurality of electron beams toward said target; deflection apparatus located adjacent the paths of such beams, said apparatus comprising a plurality of deflection elements and means for energizing said elements to produce, in a substantially common plane, at least three independently controllable and linearly independent deflection fields transverse of such beam paths, the resultant of said independent fields being a field which deflects said beams, as a group, across said target.

4. A deflection system which comprises a cathode ray tube having a target and means for producing and directing a plurality M of electron beams toward said target;

deflection apparatus located adjacent the paths of such beams, said apparatus comprising means for producing in substantially a common plane transverse of such beam paths at least three and no more than 2M linearly independent and individually controlled deflecting fields, the resultant of said independent fields being a field which deflects said plurality of beams, as a group, across said target.

5. A deflection system which comprises a cathode ray tube having a target made up of a plurality of groups of areas of light-emitting material, the areas of each group having respectively different color light-emitting characteristics and means for producing and directing toward said target a plurality of electron beams; a deflection yoke surrounding a portion of said tube between said target and said beam-producing means, said yoke including first, second and third electromagnetic coils; and means connected to said coils for energizing said coils respectively with waves of generally parabolic shape so that said coils produce fields respectively operative on such beams to effect relative movement of such beams, the resultant of said produced fields being a field which deflects said beams, as a group, across said target.

6. A deflection system which comprises a cathode ray tube and means for producing a plurality of electron beams toward said target; deflection apparatus located adjacent the paths of such beams between said beam-producing means and said target, said apparatus comprising an electromagnetic deflection yoke made up of first and second windings arranged around a portion of said tube in a region between said target and said beam-producing means, means for energizing said first and second windings for producing a deflection field active in a deflection plane transverse of the paths of such beams for causing said beams to scan said target as a function of time, a plurality of auxiliary field-producing elements within said windings, and means for energizing said elements to cause said elements to produce a field active in substantially said deflection plane for causing said beams to converge at said target at all deflection positions.

7. A deflection system which comprises a cathode ray tube and means for producing a plurality M of electron beams toward said target; deflection apparatus located adjacent the paths of such beams between said beam-producing means and said target, said apparatus comprising an electromagnetic deflection yoke made up of first and second windings arranged around a portion of said tube in a region between said target and said beam-producing means, means for energizing said first and second windings for producing a deflection field active in a deflection plane transverse of the paths of such beams for causing said beams to scan said target as a function of time, a plurality of auxiliary field-producing elements within said windings, and means for energizing said elements to cause said elements to produce M fields active in substantially said deflection plane for causing said beams to converge at said target at all deflection positions.

8. The invention defined by claim 6 wherein each of said field-producing elements comprises an electromagnetic winding arranged such that current therethrough causes it to produce a magnetic field active to produce radial movement of one of such beams.

9. A deflection system for a cathode ray tube having a target and means for producing and directing a plurality of electron beams toward said target; an electromagnetic deflection arrangement for effecting substantially misconvergence-free scanning deflection of such beams, said arrangement comprising three or more coils located around the paths of such beams between said beam-producing means and said target and means for energizing said coils individually with current waves of such shape as to cause said coils to produce, in a plane transverse of such beam paths, three or more of linearly independent fields whose resultant field is operative to effect scanning deflection of such beams as a group and in such manner that such beams substantially converge at said target at all deflected positions.

10. A deflection system for a cathode ray tube having a target structure including a screen made up of a plurality of groups of elemental phosphor areas of different color light-emitting characteristics and a shadow mask electrode having a plurality of apertures, one for each such phosphor group, and means for producing and directing a plurality of electron beam components toward said target structure, the angle of approach of said beam components toward said apertures determining the areas struck thereby; an electromagnetic deflection arrangement for effecting substantially misconvergence-free scanning deflection of such beams, said arrangement comprising a plurality of coils located around the paths of such beams between said beam-producing means and said target and means for energizing said coils individually with current waves of such shape as to cause said coils to produce, in a plane transverse of such beam paths, a plurality of linearly independent fields operative to effect scanning deflection of such beams in such manner that such beams substantially converge at said target at all deflected positions.

11. A deflection system for a cathode ray tube having a target and means for producing and directing a plurality M of electron beams toward said target; an electromagnetic deflection arrangement for effecting substantially misconvergence-free scanning deflection of such beams, said arrangement comprising a plurality between three and 2M of coils located around the paths of such beams between said beam-producing means and said target and means for energizing said coils individually with current waves of such shape as to cause said coils to produce, in a plane transverse of such beam paths, a plurality of linearly independent fields operative to effect scanning deflection of such beams in such manner that such beams substantially converge at said target at all deflected positions.

12. An electromagnetic deflection system for a cathode ray tube, which system comprises first and second pairs of coils, said coil pairs being arranged at an angle to each other to form horizontal and vertical deflection windings capable of producing raster-scanning deflection fields; and at least three auxiliary electromagnetic windings located within said first-named windings, each of said auxiliary windings being independently controllable to produce linearly independent fields within said first-named fields.

13. An electromagnetic deflection system as defined by claim 12 which further comprises means for applying current waves of horizontal and vertical deflection frequencies and of generally parabolic waveshape to said auxiliary windings.

References Cited in the file of this patent

UNITED STATES PATENTS

| | | |
|---|---|---|
| 2,672,574 | Evans | Mar. 16, 1954 |
| 2,825,846 | O'Fallon | Mar. 4, 1958 |